E. GRAY AND J. C. BICKLEY.
MILK AND CREAM TESTING APPARATUS.
APPLICATION FILED NOV. 29, 1920.
1,396,743.
Patented Nov. 15, 1921.
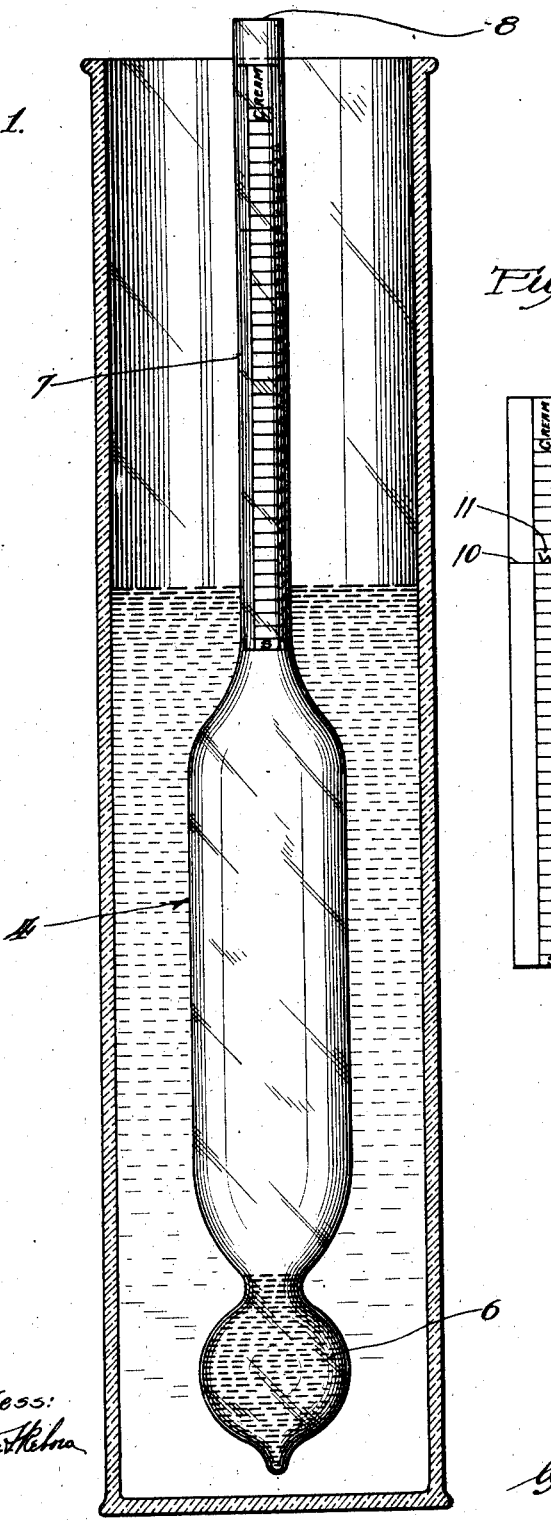
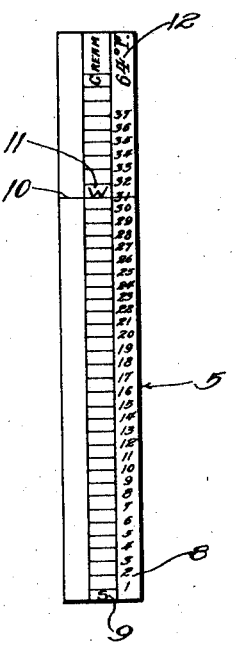
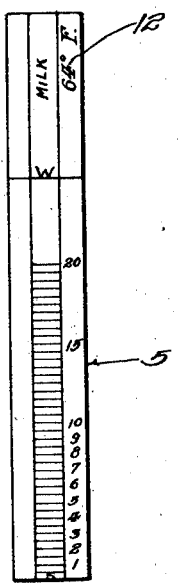
Inventors:
Eugene Gray,
James C. Bickley.

UNITED STATES PATENT OFFICE.

EUGENE GRAY AND JAMES C. BICKLEY, OF STOUGHTON, WISCONSIN; SAID BICKLEY ASSIGNOR TO SAID GRAY.

MILK AND CREAM TESTING APPARATUS.

1,396,743.    Specification of Letters Patent.    Patented Nov. 15, 1921.

Application filed November 29, 1920. Serial No. 426,894.

*To all whom it may concern:*

Be it known that we, EUGENE GRAY and JAMES C. BICKLEY, both citizens of the United States, and both residing at Stoughton, in the county of Dane and State of Wisconsin, have invented certain new and useful Improvements in Milk and Cream Testing Apparatus, of which the following is a specification.

The present invention has to do with improvements in apparatus for testing milk and cream, particularly for the purpose of ascertaining the contents of butter fat. The invention has reference to an apparatus which will indicate the percentage of butter fat by a direct and simple indication and without the necessity of going through any extended or complicated calculations or operations.

We have discovered the fact that the specific gravity of milk or cream or a mixture thereof at a certain determined temperature will give a very accurate indication of the percentage of butter fat present therein, the lower the specific gravity, the higher the percentage of butter fat. We have also found that in order to make use of the specific gravity for this purpose and in order to get an accurate indication, it is desirable that the test be performed at a temperature of approximately 64° Fah., since it is found that at other temperatures certain re-actions occur which so change the composition that the specific gravity no longer gives an accurate indication of the butter fat content.

This discovery has made it possible for us to ascertain the butter fat content in a very direct and simple manner, and by the use of very simple apparatus; but the use of this apparatus is also associated with the fact that the temperature of the liquid must be correct in order to secure accurate results.

One of the objects of the present invention is to provide a very simple apparatus for practising the process of testing milk and cream for butter fat content by means of its specific gravity. In this connection, one feature of the invention is to provide an extremely simple apparatus and one which is so arranged that it does not require any particular skill or training on the part of the user in order to secure accurate results, beyond the ability to read temperatures and figures correctly.

Other objects and uses of the invention will appear from a detailed description of the same which consists in the features of construction and combinations of parts hereinafter described and claimed.

Referring to the drawing:

Figure 1 shows a testing instrument embodying the features of the present invention as the same may be used in a simple type of bottle;

Fig. 2 shows a face view of a graduation card or index for indicating the percentage of butter fat in mixtures of milk and cream; and Fig. 3 shows a similar card or scale for use in an instrument for testing the butter fat of milk from which a large percentage of the cream has already been eliminated.

Since the testing of butter fat content is performed by ascertaining the specific gravity of the liquid at a certain temperature and from a knowledge of butter fat content which corresponds to such specific gravity, it is possible to provide a specific gravity meter which will give a direct reading of butter fat content. This we have done in the arrangement illustrated in the drawing. This arrangement includes a hydrometer designated in its entirety by the numeral 4, and adapted to set bodily into the liquid, in combination with a scale 5 of suitable markings to directly indicate the butter fat content provided the temperature of the liquid is correct.

The hydrometer is provided on its lower end with a weight bulb 6, and on its upper end with a tubular stem 7 into which the graduation card is placed. The indications on this scale are so proportioned to each other and to the hydrometer, that the scale marking at the point where the stem breaks through the surface of the liquid is the correct reading of the butter fat content. Ordinarily the upper end 8 of the stem is sealed after the scale has been set in place.

In Fig. 2, we have shown a scale laid out flat, in the manner in which a sheet of paper or paste board might be printed or marked as a scale for use in the testing of liquids containing a considerable percentage of cream, as for example milk fresh from the cow. The right hand side of the scale carries a column or row of numerals 8 which designate percentage of butter fat for the particular hydrometer when used at a temperature of 64° Fah. The numerals of this scale read upward, commencing at the lower end; since the specific gravity is highest for pure skimmed milk which also contains no butter fat. We have therefore designated the lower end of the scale with the letter "S" shown at the point 9, which letter designates skimmed milk. At the point 10 which is the level at which the hydrometer scale will stand in line with the surface of a liquid of specific gravity equal to that of water, we have provided a marking "W" as shown at 11, the same designating the position at which the scale should stand in a water bath of 64° Fah.

Experiment has also determined the fact that when the specific gravity of a milk or cream mixture at 64° Fah. is unity or the same as water, its butter fat content is 31 percentage by weight; and we have therefore placed the numeral 31 at the line 10 which is the water line, since if the mixture of milk and cream is such as to make the hydrometer stand at this level and is 64° Fah., it contains 31 percentage butter fat.

Between the lines designated S and W, we place the scale markings reading in uniform manner up to 31, and we prefer to carry these markings on up to approximately 36 or 37 as shown in Fig. 2, since the richest cream which will probably ever be tested in this manner will not contain more than 36 or 37 butter fat by weight at 64° Fah.

The scale shown in Fig. 3 is similar to that of Fig. 2 with the exception that it is intended for use in a hydrometer more specially adapted for the testing of milk from which a considerable portion of cream has already been removed. Consequently the scale in Fig. 3 has its markings widened out considerably and will give more accurate reading for the testing of butter fat content of such milk.

In the upper portion of the scale, we prefer to place a temperature indication of 64° Fah. as shown at the point 12 so as to constantly remind the user of the instrument that the liquid should have this temperature in order to secure accurate results. Nevertheless, the presence of this mark is not essential to the accurate use of the instrument provided the temperature be correct.

It will be observed that in each case the scale bears such markings with respect to the hydrometer in which it is intended to be used that it gives a direct reading of butter fat content, and for this purpose takes advantage of the discovery which we have made in regard to the relation of specific gravity to butter fat content when the test is made at substantially 64° Fah.

It is observed that the hydrometer is shown in Fig. 1 as being used within a relatively large jar. We have found that if the testing jar be made too small in diameter, the capillary action will affect the readings of the hydrometer to such an extent as to impair their accuracy. However, by proportioning the diameter of the jar at least twice as large as the diameter of the hydrometer this inaccuracy is reduced to such an extent as to become negligible.

We claim:

An instrument for the testing of the butter fat contents of sweet milk and cream, comprising a hydrometer having a float, a weight at the bottom end thereof, an upstanding hollow neck, and a scale member within said neck, said scale member having marking visible through the neck and including graduations commencing with 1 at the lower end and increasing in value toward the upper end, there being a mark at the position of the indication 31 showing that this is the position assumed by the instrument in pure water of a temperature of 64° Fah. and the instrument being so proportioned that when immersed in milk of no butter fat content and having a temperature of substantially 64° Fah. it will stand with the scale at the zero position, and being so proportioned that when immersed in milk having any proportion of butter fat content and having a temperature of substantially 64° Fah. it will stand with the scale at the position to indicate the correct percent of butter fat content, substantially as described.

EUGENE GRAY.
JAMES C. BICKLEY.